Jan. 1, 1952     L. GROSS ET AL     2,580,763
RECORD CONTROLLED ACCOUNTING DEVICE

Filed June 15, 1950     4 Sheets-Sheet 4

INVENTORS
LEONARD GROSS
ERIC BAILEY
BY J. W. Armbruster
ATTORNEY

Patented Jan. 1, 1952

2,580,763

UNITED STATES PATENT OFFICE 2,580,763

RECORD CONTROLLED ACCOUNTING DEVICE

Leonard Gross, New Barnet, and Eric Bailey, Letchworth, England, assignors to International Business Machines Corporation, New York, N. Y., a corporation of New York Application June 15, 1950, Serial No. 168,232
In Great Britain June 30, 1949

17 Claims. (Cl. 235—61.9)

The present invention relates to improvements in printing tabulators controlled by record cards.

It has been the practice when printing data from cards with a tabulator to distinguish card listing and card tabulating. In card listing, each card is fed, sensed, and the sensed data printed on a sheet, usually with a line feed of the sheet for each card. In card tubulating, all cards having certain common data recorded therein comprise a group, and the data from the cards as they are sensed, are inserted in the accumulators and storage devices, and at the end of the group the card feed is suppressed and the accumulated totals in the accumulators and storage devices, are then printed. A modification that has also been used consists of tabulating with first card list, i. e. certain data on the first card printed, usually alphabetical indicative matter, and the same data suppressed from being printed from the subsequent cards of the group, while value data from all the cards of the group are entered into accumulators.

Thus, when a printing tabulator is used for addressing invoices, the address cards relating to a customer are fed in ahead of the detail cards relating to the invoices of the same customer. All the address and detail cards relating to the same customer bear the same account or reference number. Thus, first of all, the address cards are printed in succession, followed by detail cards. At a change of reference number, total taking cycles ensue, in which the card feed is suppressed and any totals or balance required are printed, the accumulators are zeroized, and only then is the next card group fed and read.

It is an object of the present invention to carry out an operation of the kind described in a lesser number of cycles of the machine than heretofore.

The present invention as applied to printing invoices will require, in contradistinction to the previous procedure referred to, that the address cards are fed in at the end of the group of detail cards to which they relate and that the address cards should bear the common reference number to which they belong, but should be differentiated from the detail cards by a special designation. On sensing of this designation, total taking cycles will ensue, but feed of the address cards will continue, so that the address cards may be printed at the same time, and in line with the totals.

With this arrangement, any false positioning of the address card or cards is at once detected, so that the machine may be stopped by reason of a change of reference number occurring before a change due to an "address card" designation. This insures that detail cards are followed by their address cards and that address cards are not, owing to incorrect positioning, immediately followed by detail cards belonging to the same account.

Another application of the invention is to enable totals to have indicative matter to explain them printed beside them without the need for alphabetical storage devices.

A card which bears matter not required to be entered into accumulators, such as numerical indicative data or alphabetical data such as addresses, will be referred to hereinafter as "an address card."

According to the invention, a printing tabulator controlled by record cards is provided with means to feed record cards comprising "detail cards" and "alphabetical cards" from a single stack, sensing means to sense the cards so fed, means for differentiating a "detail card" from an "alphabetical card," means to enter values from detail cards into an accumulator or accumulators, and is characterized by means to print values from an accumulator concurrently with printing data sensed from an alphabetical card in the same cycle so as to print the data and the values on the same line.

In the preferred form of the invention there are provided means for adding debit amounts on the detail cards into one accumulator and credit amounts into another accumulator and printing both amounts, means operative on the sensing of the designation record on the first alphabet card fed, to initiate a succession of cycles in which totals of the debit and credit amounts are printed and a balance taken and printed, and means for printing the data on the alphabet cards during the said succession of cycles, whereby the said data are printed on the same lines as totals or balance derived from the detail cards. Automatic group control devices may be employed to stop the feed of cards in the event of two successively fed cards having different reference numbers, in the cases where the two cards are both detail cards or both alphabet cards or a detail card followed by an alphabet card, but not in the case of the last alphabet card being followed by a detail card. Means may be provided for stopping the feed of cards in the event of the number of alphabet cards being less than the number of cycles in the said succession of cycles, and of restarting the feed after the last of the succession of cycles.

Other objects of the invention will be pointed out in the following description and claims and illustrated in the accompanying drawings, which disclose, by way of example, the principle of the invention and the best mode, which has been contemplated, of applying that principle.

The invention will be described in its application to a Hollerith Tabulator of the type shown and described in British Patent specification No. 422,135 corresponding to the U. S. Keen Patent No. 2,174,699, issued on October 3, 1939. The application requires little alteration in the mechanical part of this tabulator, but it requires the addition of certain relays and some multiplication of the electrical circuits. The circuit diagrams are given showing the operation of all cams, relays and commutators in carrying out the invention.

The tabulator has a feeding apparatus for feeding cards one by one from a magazine through two stations in succession, in which each card is sensed by a row of brushes. The first station is called the Upper Brush Station and the second the Lower Brush Station. Feed is effected by energizing a magnet designated "Feed" in Fig. 2, and the energization effects, by operation of a one-revolution clutch, the feed of one card through each of the stations. For continuous feeding of cards, one per cycle, the feed magnet must be kept energized or reenergized each cycle.

Figure 5:
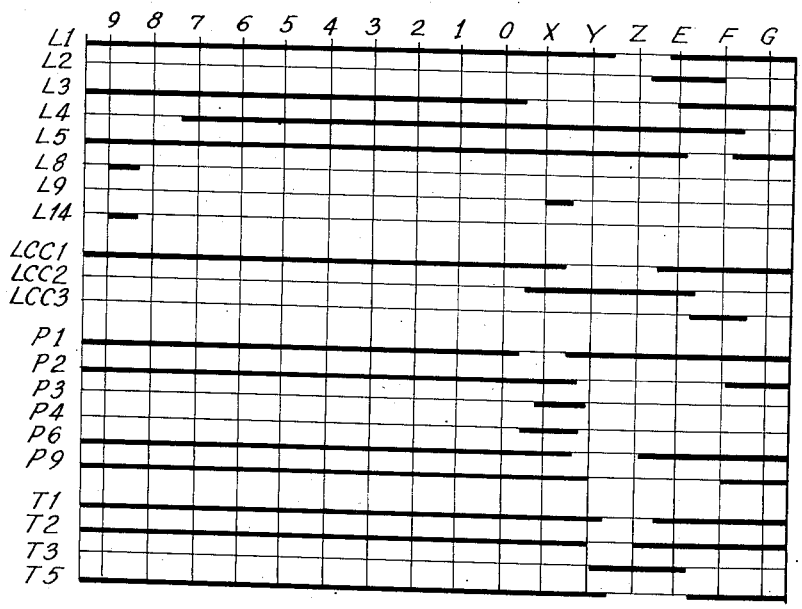
Fig. 5 is a timing chart.

The cycle is divided into 16 points, of which points 9 to 0 indicate the times in the cycle at which index points 9 to 0 on a card pass under the sensing brushes respectively. Then follow points termed X, Y, Z, E, F, G. This division of the cycle is shown in Fig. 5, in which the time of closure of the various cam contacts is indicated.

As soon as a card reaches a sensing station, a card lever closes certain contacts. These levers, at the upper and lower brushes respectively, are designated UCL and LCL.

Two accumulators, each with two decimal denominations, are shown in the diagram. Each accumulator denomination is provided with a readout commutator, wherein an electrical connection is made at the point representing the digit at which the accumulator denomination stands. Certain relays, termed functional relays and designated by the letter F, and others termed group distributor relays and designated by the letters GD, are employed to control the operations of the accumulators and printing apparatus. The following operations can be performed by the use of these relays: A number read by the lower brushes can be entered into an accumulator, or the printing apparatus (1) for adding, (2) for printing, or (3) the number can be entered simultaneously into both accumulator and printing apparatus. The number standing in one accumulator can be entered into another accumulator (4) for addition therein or (5) for subtraction, by entering the complement to 9. (6) The amount standing in an accumulator can be entered into the printing apparatus for printing.

Each card is sensed at the upper brushes for control purposes. In the operation to be described by way of example, the cards will be assumed to have been sorted into groups, each group containing information for printing an invoice, containing debit items and, generally, credit items and three or more cards containing a name and address. The debit and credit cards will be termed "Detail" cards and the latter cards will be termed the "Alphabetical" cards, since, apart from a house number, only alphabetical information is obtained from them. They are designated on the cards themselves, for example, by a hole punched in one of the index positions 0 to 9 in a particular column. A card containing a credit item is designated by a hole punched in the X or Y position in a column, the position of the hole distinguishing the card from an alphabet card. The group reference number is punched in a certain field in each card and is sensed at the upper and lower brushes. If the two cards at the upper and lower brushes belong to the same group, the same number is sensed at the two stations, and therefore in any one column the same digit is sensed at the same instant. Control depending on such sensing is well known as Automatic Group Control. Hitherto, it has always been used to initiate, at the end of a group of cards, a series of cycles during which totals and balances of the cards in the group are taken and printed. Since it is commonly employed in tabulators, the related circuits will not be shown in detail in the diagrams. In the present application it is not used in the customary way, but is made use of to detect the inclusion, by error, in a group of cards of any card belonging to another group, and, on such detection, to stop the machine and give a signal.

The cards in a group will be arranged so that the alphabet cards follow the detail cards. Then, according to the invention, the sensing of an alphabet card designation at the upper brushes will start a succession of cycles during which certain of the functional relays will be energized to effect printing of the totals of the debit and credit items, subtraction of the credit total from the debit total, by entering the credit total into the debit accumulator, printing the balance, namely the total then in the debit accumulator and, finally, resetting of the accumulators to zero. At the same time, the alphabetical information on the alphabet cards will be printed. The operation carried out during this succession of cycles will be termed "cycling."

In the circuit diagram, Figs. 1, 2, 3 and 4, relays, when not named, are designated by numbers or by a letter or letters followed by a number, and the contacts operated by a relay are designated by the designation of the relay followed by a capital letter. Certain relays have separate pick-up and holding windings; these are designated by adding the letters PU or H. Relay contacts are shown in the condition in which they are when the relay is not energized. When a relay is energized, its contacts will be referred to as "open" or "closed" when they merely open or close a circuit, or as "shifted" when they move from one contact to another.

Letters L, P, T, LCC, followed by a number, designate cam contacts which close during the times shown by a heavy line in the timing diagram, Fig. 5. In the example about to be described, the switches are all in the positions shown.

The tabulating machine to which the invention is applied has other circuits than those shown; circuits which are not necessary to the disclosure of the present invention have not been shown.

The two supply lines are 11 and 12. The driving motor M (Fig. 2, top) runs continuously when the switch 1/4 is closed. A resistance 13 in the field circuit can be shortcircuited by either of the contacts 1A or 5A to reduce the speed of the motor. On closing switch 1/1 (Fig. 1, centre), relay LC7PU is energized by a circuit through lower contacts LCLA. The holding coil, LC7H (Fig. 2) is energized through contacts LC7B (closed) and cam contacts L5, which break bebetween cycle points E and F (Fig. 5).

Figure 1:
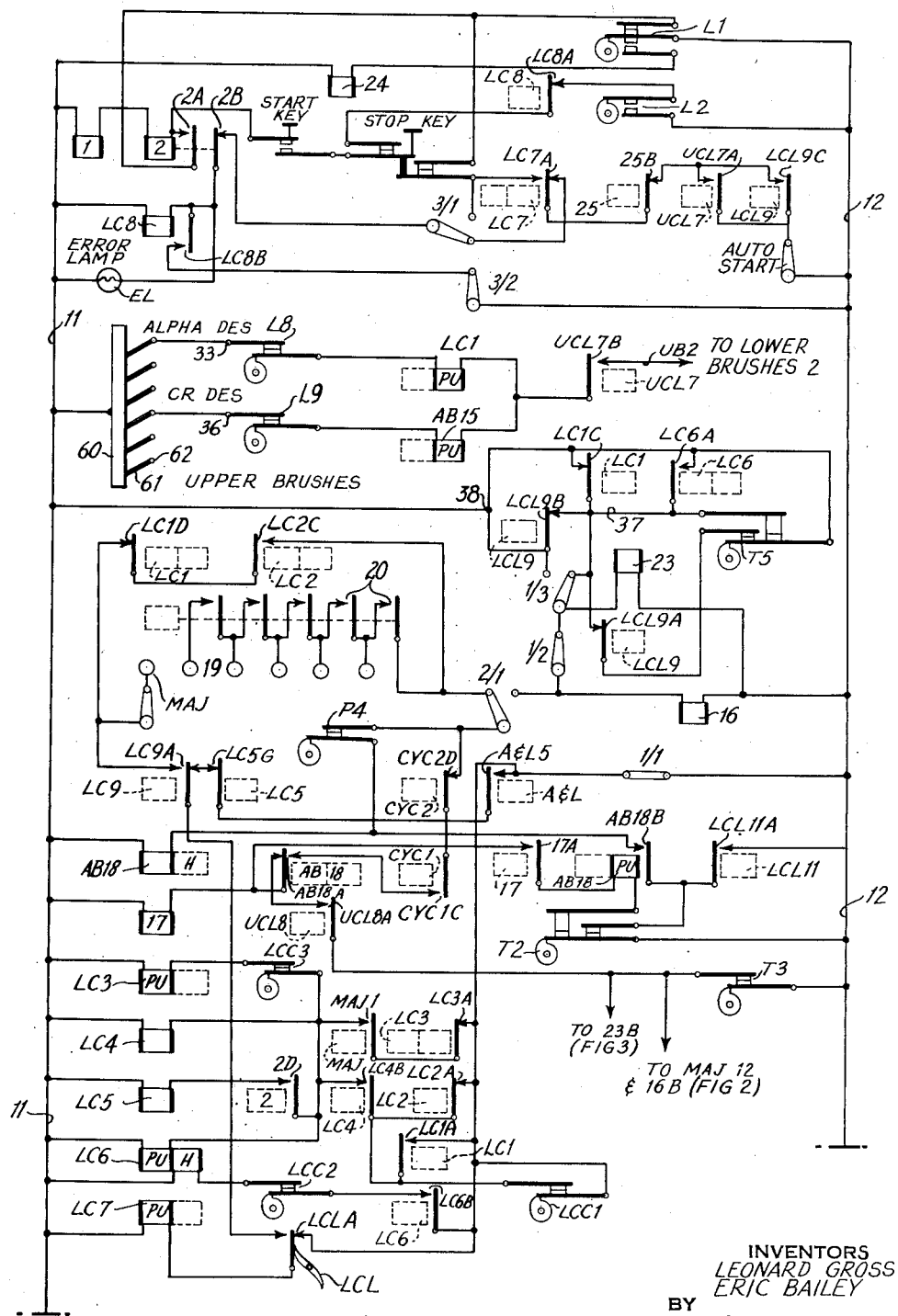
Figs. 1-4 show the wiring diagram and the electrical controls.
Figure 2:
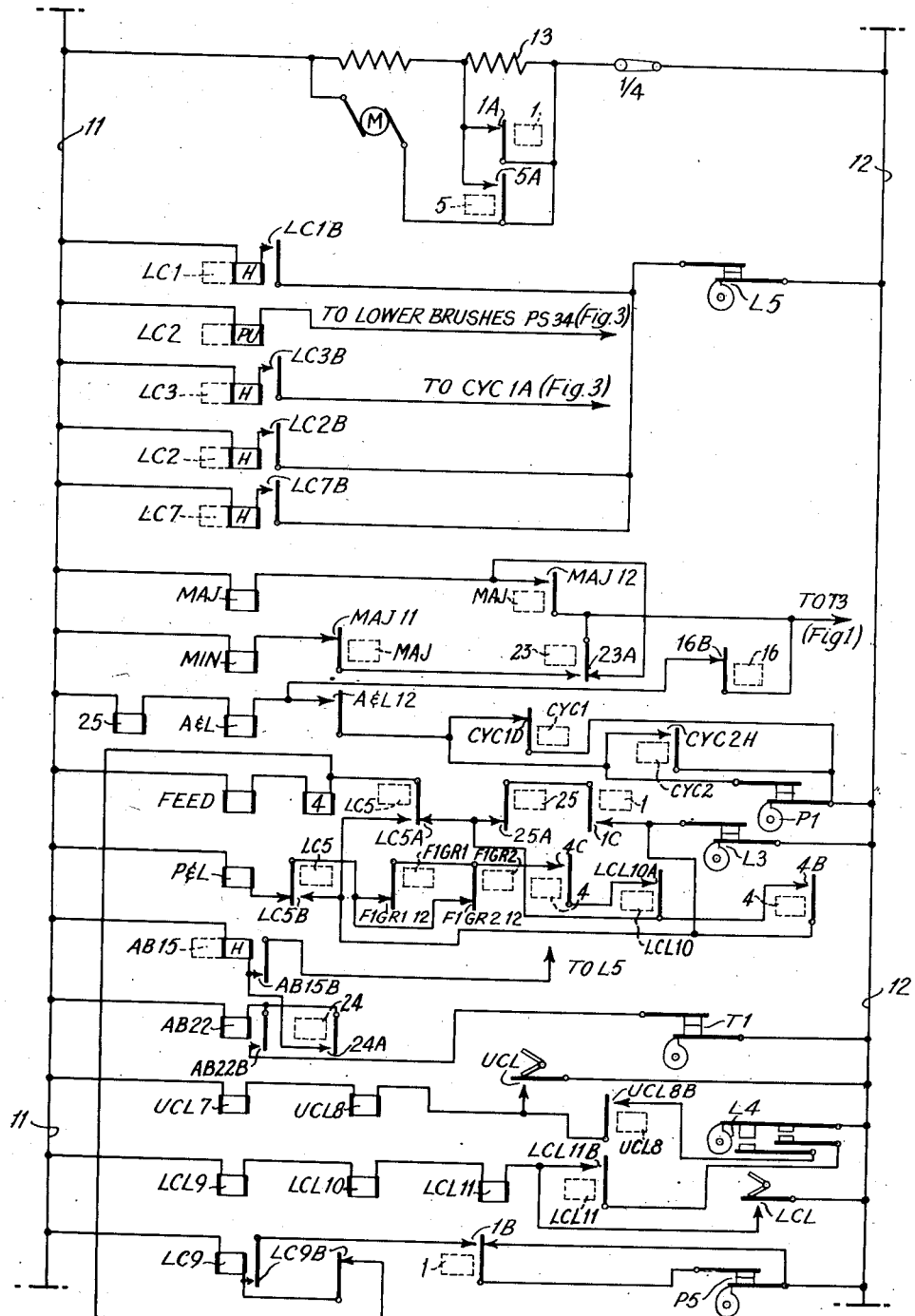

On depressing the Start Key (Fig. 1, top) a circuit is completed through relays 1 and 2, lower contacts of the Stop Key, contacts LC8A and cam contacts L2. Contacts 1C then close (Fig. 2, centre) and complete a circuit through the feed clutch magnet (designated Feed), through relay 4, contacts LC5A, 25A, 1C (closed) and cam contacts L3. A card will then be fed past the upper brushes. The circuit will then be broken after 0 by L3, but the card lever contacts UCL will be closed by the card to energize relays UCL7 and 8 (Fig. 2, bottom). These are held through contacts UCL8B (closed) and L4. At the same time, closing of contacts 2A (Fig. 1, top) completes an alternative start circuit through cam contacts L1. This breaks the start circuit after Y. The Start Key is then depressed again, circuits being completed as before, while a card is fed past the lower brushes, closing lever contacts LCL (Fig. 2, bottom) to energize relays LCL9, 10, 11, which are held through contacts LCL11B (closed) and cam contacts L4. Contacts LCLA (Fig. 1, bottom) are then shifted to break the circuit through LC7PU, and the LC7 relay is then under control of cam contacts L5 (Fig. 2, centre), which break momentarily between E and F. The Start Key is then depressed a third time. Through contacts 2A (closed) the circuit is held under control of L1. These contacts open the circuit for a short time after Y, but, during the break, contacts L5 close and keep the start circuit closed by the alterative route through contacts LC7A (shifted), 25B, UCL7A or LCL9C, and the auto-start switch.

Continuous operation thus depends on relay LC7 being energized every cycle to maintain the alternative start circuit closed. The circuit for energizing it is from line 11, relay LC7PU, contacts LCLA (shifted), LC9A (shifted, because relay LC9 is energized with the feed magnet) to a plug socket designated MAJ. From this, a plug connection is made to one of the Automatic Group control plug sockets 19; the connected contacts 20 are closed so long as the reference numbers on the cards sensed remain the same. Thus the circuit continues through switch 2/1, contacts P4, contacts AB18B (closed) and LCL11A (closed) to line 12.

In this way the alternative "start" circuit is closed in every cycle so long as the cards sensed in the upper and lower brushes belong to the same group; it fails to be closed if a card with a different reference number is sensed. In this case, when contacts L1 open, the circuit through contacts 2A also opens and feed of card stops, because relay 1 is deenergized.

A circuit is then completed from line 12 as before to contacts LC7A, switch 3/1, contacts 2B and relay LC8 and an error lamp EL in parallel therewith. Relay LC8 is held through its contacts LC8B (closed) and switch 3/2. Contacts LC8A open and prevent the feed being started again until relay LC8 is deenergized by opening switch 3/2.

Relay AB18 is not used in this example, and it is sufficient to explain that it is energized as soon as cards pass the upper brushes and remains energized until cards run out. Assuming that the details cards are correctly sorted in the group, they are fed continuously, as described, until the first alphabet card passes the upper brushes.

The upper brush station (Fig. 1, centre) is shown, with its contact roll 60 connected to line 11, and brushes 61, each with a plug socket 62. The lower brush station (Fig. 3, centre), with brushes 64 and plug sockets 65, has its contact roll 63 connected to line 12 through contacts LCL10C (closed when LCL is operated by a card) and the customary circuit breakers 59. It will be assumed that the uppermost brush 61 at the upper brush station senses the column containing the alphabet card designation. This brush then is connected to plug socket 33, which is connected through cam contacts L8, which close at the moment the designation is sensed. From the cam contacts, the circuit is through relay LC1PU and contacts UCL7B (closed) to the point LB2 in the lower brush circuit and through circuit breakers 59 to line 12. Relay LC1, thus energized, closes its contacts LC1B (Fig. 2, top), to complete the holding circuit of the relay through cam contacts L5.

Next, it will be assumed that the fourth brush down, 61, at the upper brush station, senses the column containing the designation indicating that the value recorded on the card represents a credit. A connection is made to plug socket 36 and there is a circuit through cam contacts L9 and relay AB15PU to the alphabet designation circuit at a point before contacts UCL7B. Thus relays LC1 and AB15 are energized when the alphabet and credit designations, respectively, are sensed at the upper brushes.

It will now be explained what occurs when the first alphabet card enters the upper brush station, with the result that relay LC1 is energized. So long as cards have the same reference number, there are circuits from line 12 through relays 16 and 23 (Fig. 1, centre) to point 37. From point 37 there are three parallel circuits to point 38, which leads to line 11; one circuit being through contacts LC1C, another through contacts LCL9B and another through cam contacts T5. LC1C and LCL9B being now open, when cam contacts T5 break after Y, relays 16 and 23 are deenergized. There is then a circuit from line 12 (Fig. 1, lower half), cam contacts T3, contacts 23A (Fig. 2, centre) through the MAJ relay to line 11. The MAJ relay is held through contacts MAJ12, 16B, A and L12 and cam contacts P1 to line 12. Contacts MAJ1 close (Fig. 1, bottom) and complete circuits from line 11 through, in parallel, relay LC4, relay LC5, and contacts 2D (closed), and relay LC6PU, contacts LC3A and switch 1/1 to line 12. Contacts LC4B close to provide a holding circuit for relays LC4, 5 and 6 through cam contacts LCC1 (closed till after X) or through contacts LC2A or contacts LC1A when closed. Relay LC6 has an independent holding circuit through contacts LC6B (closed) and cam contacts LCC2 (closed during the break in LCC1). All subsequent alphabet cards energize relay LC1; consequently contacts LC1A are closed to bridge the opening of cam contacts LCC1 and then maintain the holding of relays LC4, 5 and 6, so long as alphabet cards are passing.

As a result of relay 16 being deenergized, the A&L magnet (Fig. 2, centre) and relay 25 are energized by a circuit from line 12, contacts 16B, cam contacts T3 to line 12. There is a holding circuit through contacts A&L 12 and P1.

Figure 3:
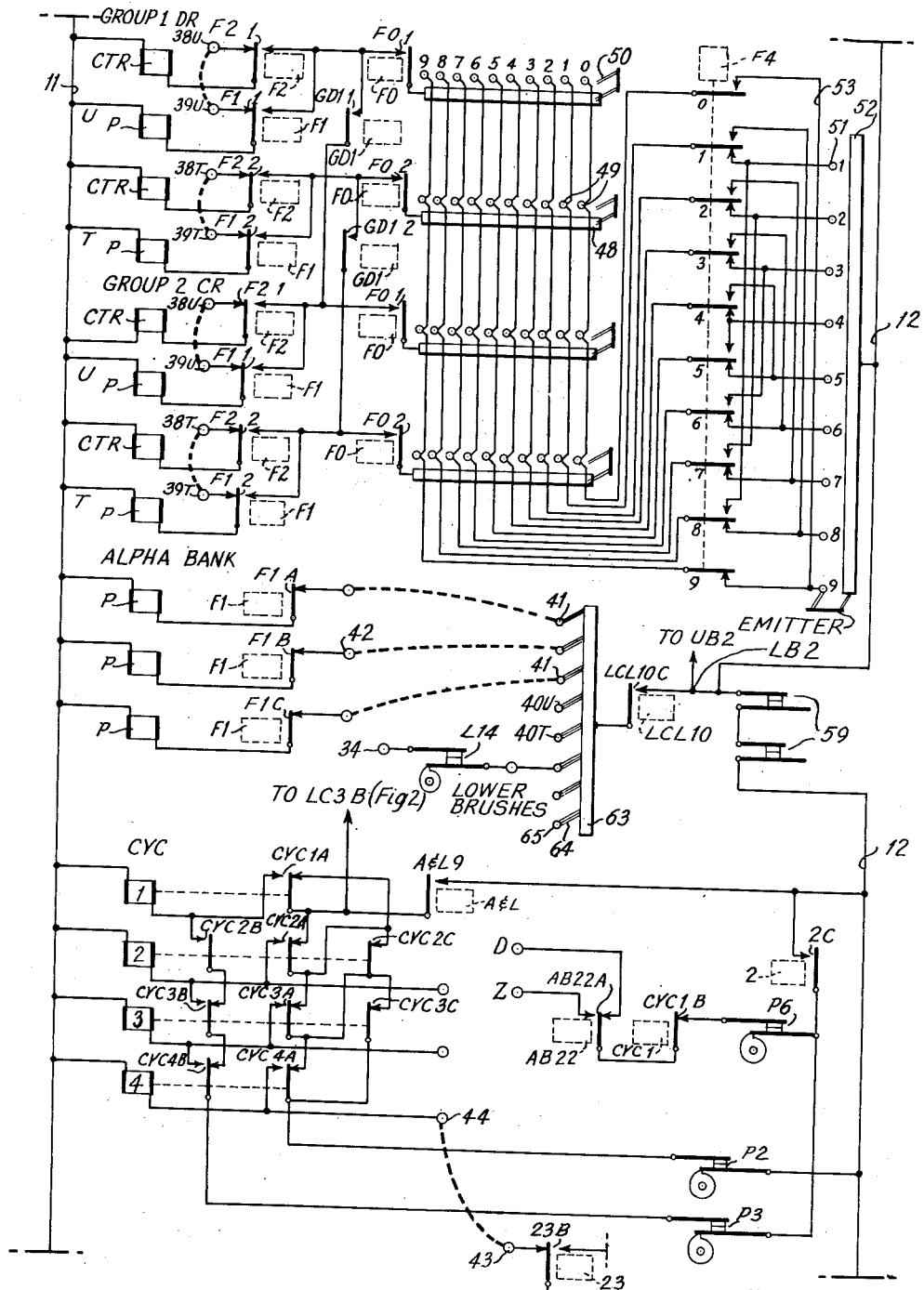
Figure 4:
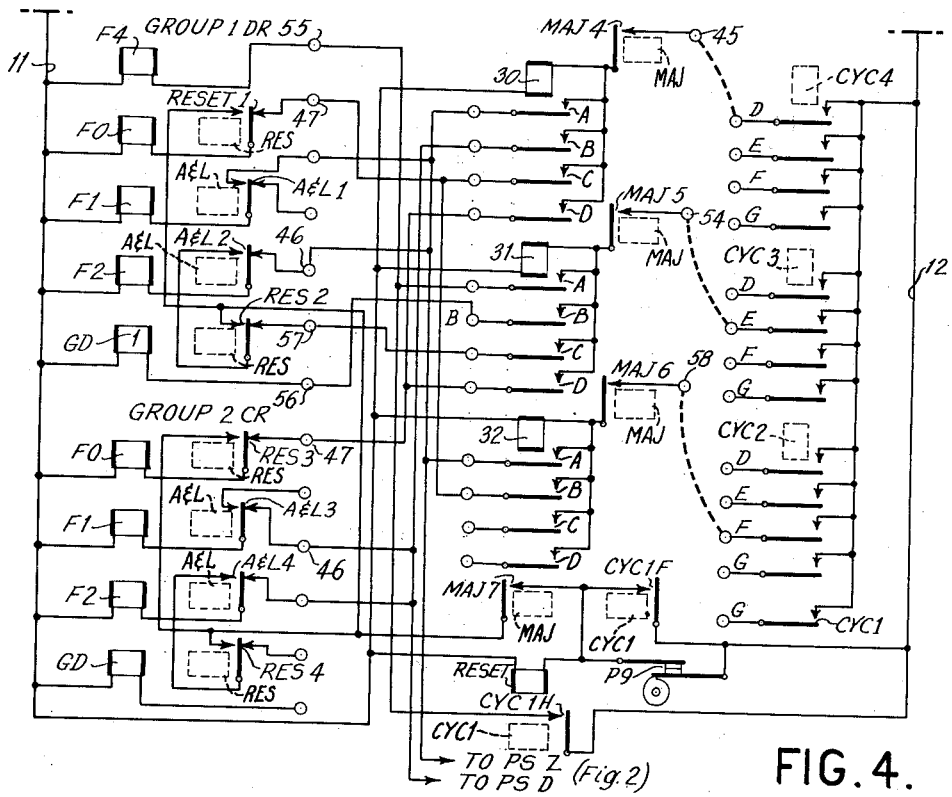

The accumulator and printing magnets are shown in Fig. 3, top, designated CTR and P respectively. Two accumulators are shown designated groups 1 and 2, each having two denominations, assumed to be decimal, designated U, for units, and T for tens. Accumulator 1 is to receive the debit amounts and accumulator 2 the credit amounts. Each accumulator magnet is controlled by contacts F2 and is normally connected to plug socket 38U or 38T. Each printing magnet is controlled by contacts F1, and is normally connected to plug sockets 39U or 39T.

For listing and adding the debit and credit items, plug connections are made from the appropriate plug sockets 40U and 40T of the lower brushes to plug sockets 38U and 38T, respectively, of accumulators 1 and 2, and all sockets 38 are connected to sockets 39 controlling the printing magnets. So connected, both accumulators and print magnets would receive both debit and credit items. These are restricted to their appropriate accumulators and print magnets as follows: The sensing of a credit designation at the upper brushes energizes relay AB15PU, as explained. The holding relay AB15H (Fig. 2, bottom) is held through its contacts AB15B, controlled by L5, which breaks from E to F plus. Relay 24 (Fig. 1, top) is energized by L1 lower contacts from Y plus to E. Its contacts 24A (Fig. 2, bottom) close a circuit which energizes relay AB22, with holding contacts AB22B, controlled by T1, which makes at Z1/2 before the L1 upper contacts break. Now there is a circuit (Fig. 3, centre) from line 12, through contacts 2C (closed), cam contacts P6, contacts CYC1B and contacts AB22A to plug socket D, which is connected to the plug sockets of the F1 and F2 relays of the second group, which comprises the credit accumulator. When, therefore, there is no credit designation, relay AB22 is not energized, its contacts AB22A are normal and the F1 and F2 relays of the credit accumulator and printing magnets disconnect them from their plug sockets 36 and 39, and so restrict entries to the debit accumulator and printing magnets. When, however, a credit designation is sensed, contacts AB22A shift, and the circuit is made to plug socket Z, which is connected to the plug sockets of the F1 and F2 relays of the first group, which comprises the debit accumulator. Thus, the sensing of a credit designation restricts entries to the credit accumulator and printing magnets.

During the passage of the alphabet cards, the alphabetical information is printed by the ALPHA Bank (Fig. 3, centre). The plug sockets 42 of the printing magnets of this are connected to plug socket 41 of brushes at the lower brush station.

It has been explained that, on the passage of the first alphabet card past the upper brushes, relay MAJ is energized, and relays LC4, LC5 and LC6 are energized. A series of cycles is now started by a circuit from line 12, cam contacts T3 (Fig. 1, bottom) MAJ relay contacts 23B, (Fig. 3), plug socket 43, connection to plug socket 44 (Fig. 3, centre), CYC4 relay, to line 11. CYC4A contacts close to provide a holding circuit through P2. There is a shunt holding circuit through contacts CYC3C, 2C, 1A and A&L 9 (closed) to line 12. Contacts CYC4B shift, completing a circuit from line 12, contacts 2C (closed), cam contacts P3 to CYC3 relay. This relay energizes and holds through its A contacts, CYC2C and 1A contacts and A&L 9 contacts (closed). CYC3C contacts open, so when P2 opens, CYC4 relay de-energizes. The holding circuit of CYC3 is then through its contacts 3A (shifted), contacts CYC4A to P2. CYC2 and 1 relays are then energized similarly, in successive cycles.

Each CYC relay has contact points D to G (Fig. 4) and, by one of them, is connected through relays 30, 31, and 32 to the functional and group distribution relays F0, F1, F2, F4 and GD in two groups.

In the first cycle, CYC4D contacts connect line 12 through a connection to plug socket 45, whence the circuit is through MAJ4 contacts (closed) and relay 30 to line 12. Relay 30A and B contacts (closed) and plug sockets are connected to plug sockets 46 to complete the circuits through relays F1 of groups 1 and 2, respectively. Thereby the printing magnets (Fig. 3, top) are disconnected from the lower brushes. Also relay 30C and D contacts (closed) and plug sockets are connected to plug sockets 47 to complete the circuits through relays F0 of groups 1 and 2, respectively. Thereby the printing magnets of both groups are connected to the respective readout commutator. These have common segments 48 and ten segments 49 representing the digits 0 to 9. A brush 50 connects a segment 49 to the common segment 48 to represent the digit standing in the related accumulator denomination. The ten segments 49 are connected to the centres of the 10 sets of contacts numbered 0 to 9 of relay F4, and the contacts 1 to 9 are connected normally to the segments 51, 1 to 9 of the emitter of which the common contact strip 52 is connected to the line 12, through circuit breakers 59. The lower contacts of F4 are connected in pairs to the upper contacts by lines 53; the two members of each pair having the sum 9. Therefore, if the relay F4 is energized to shift the contacts, a segment 49 is connected to the line 12 by the emitter at a time representing the complement to 9 of the number of the segment.

Relays F1 and F0 of each denomination in each group having shifted their contacts, there is a circuit from line 12 through the emitter segment 51 to the commutator segment 49 and 48 of all denominations, through contacts F0 (closed), to contacts F1 (shifted) and to the printing magnets. Thereby the totals of the two accumulators which were represented on the commutator are printed.

In the next cycle, CYC3 relay closes its contacts (Fig. 4, top) and a circuit through its contacts and plug socket E to plug socket 54, through contacts MAJ5 (closed) and relay 31, energizes this relay. Its A contact (closed) and plug socket is connected to plug socket 55 to complete a circuit energizing relay F4. Its B contact and plug socket is connected to plug socket 56 connected to relay GD1 of group 1. Its D contacts are connected to plug socket 47 of relay F0 in group 2, and its C contacts are connected to plug socket 57 of relay F2 in group 1. Thereby relays F2 and GD of group 1 and relay F0 of group 2 and relay F4 are energized. Contacts GD1-1 and GD1-2 close (Fig. 3, top) and connect the two commutators of group 2, through the contacts F0-1 and 2 of group 2 to the two denominations respectively, of group 1. The number standing in accumulator 2, that is the credit accumulator, will then be added to the number standing in accumulator 1, but, owing to relay F4 having been energized, the number will be added as a complement to 9 and therefore will, in effect, be subtracted. The elusive 1 will be added in the usual way by adding to the unit denomination a carry from the highest denomination. It is assumed that the credit total is less than the debit total, so that the balance standing in accumulator I is a true number.

In the third cycle, CYC2 relay, by closing its contacts (Fig. 4, top) completes a circuit from line 12, CYC2 contacts and F plug socket, to plug socket 58, contacts MAJ6 and relay 32 to line 11. Contacts and plug sockets 32A and B are connected to plug sockets 46 and 47 respectively, to energize relays F1 and F0 of group 1. Thereby the balance standing in the accumulator I is printed by the magnets of the same group.

In the fourth cycle, that is the one under control of the cycle I relay, relay CYC1 closes its contacts CYC1F (Fig. 4, bottom) to complete a circuit from line 12 and the reset magnet to line 11. Also through the same contacts a circuit is completed from line 12 through contacts MAJ7 to the upper reset contacts of F0 and F2 (closed) in all denominations. Also, by closing of contacts CYC1H, relay F4 is energized by a circuit through plug socket 55. Thereby the complement of what is standing in each accumulator is added into the same accumulator, which, with the elusive 1, brings the accumulator to zero.

During each of these cycles an alphabet card has been fed and the data sensed and printed so that at the end of the operation the printed result would appear as shown below. A reference has been added indicating the function carried out on each cycle. If the address cards had been sorted in ahead of the detail cards and printed at the head of the account as heretofore, four cycles would have been necessary for printing the alpha cards and four cycles for total-taking. Thus the operation carried out according to the invention shows a saving of four cycles in this particular example.

|  | Credit | Debit |  |
|---|---|---|---|
|  |  | 12 |  |
|  |  | 23 |  |
|  | 21 |  |  |
|  |  | 38 |  |
| Mr. E. Howard Icknield Way | 21 | 73 | (Cycle 4 Printing totals) (Cycle 3 Subtracting credit from debit) |
| Letchworth Herts. |  | 52 | (Cycle 2 Printing balance) (Cycle 1 Reset Accumulators) |

It may be observed that other descriptive alphabetical matter could be printed in place of the name and address. Also, by use of the usual spacing devices, the alphabet information, together with the totals and balance may be printed not immediately under the listed items but, for example, at the bottom of the bill or account sheet.

It may be noted that cam contacts P1 (Fig. 2, centre) are shunted by contacts CYC1D and CYC2H when closed. These shunts are for the purpose of maintaining the A&L magnet energized until the end of cycle 1.

The circuits described have been arranged for four cycles, during which the totals and balance are printed. The number of alphabet cards may, however, be equal to, greater than, or less than, four, and then certain provisions have to be made to maintain or interrupt the feed circuit.

It was explained that the continued feed of the cards depended on relay LC7 (Fig. 1) being energized every cycle and that this was effected so long as a circuit was maintained through the Automatic Group control contacts 20, which were closed so long as the cards passing belong to the same group. Now, if the number of alphabet cards is equal to or greater than four, a change of group reference number will be sensed when the last alphabet card passes the lower brushes and therefore contacts 20 will break and the feed will be stopped. Thus provision has to be made to maintain LC7 energized.

As explained, the alphabet cards in passing the lower brushes energize relay LC2, (Fig. 2, top), which holds by its LC2B contacts through L5. With LC2C contacts closed (Fig. 1, centre), there is a circuit shunting the 20 contacts from line 11, relay LC7PU, contacts LCLA (shifted), contacts LC9A (shifted), contacts LC1D and LC2C (closed), switch 2/1, cam contacts P4, contacts AB18B (closed) and LCL11A (closed) to line 12. It may be noted that relay LC1 is not energized when the last alphabet card of a group is at the lower brushes, because the next detail card is at the upper brushes.

If the number of alphabet cards is less than four, relays LC4, 5 and 6 and also LC9 will be deenergized in the last cycle, and therefore the feed clutch will be deenergized. However, relay LC7PU will be energized by a circuit through contacts LCLA (shifted), LC9A, LC5G, A&L5 (shifted) and switch 1/1 to line 12. It will remain energized until the end of cycle 1 when relay A&L deenergizes.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record printing machine controlled by groups of records bearing numerical and alphabetical data indicia, each of said groups comprising detail records preceding alphabet records and distinguished therefrom by a special indicium on alphabet records, means for feeding said records in succession, means for sensing said data indicia, accumulating and printing control means operated under control of said sensing means, total printing control devices, means for sensing said special indicium when there is a change within a group from detail to alphabet records, and means under control of said indicium sensing means for controlling said printing means and said total printing means to print totals from the accumulating control means concurrently with alphabet data sensed from an alphabet card in the same cycle so as to print the alphabet data and a numerical value on the same line.

2. A machine of the kind set forth in claim 1 in which there are means for operating a succession of total taking cycles and means under control of said special indicium sensing means for initiating operation of said total taking means and for switching from the accumulator to the printer the sensing connections from the record sensing columns.

3. A machine of the kind set forth in claim 2 and having means for adding debit amounts of the detail records in one accumulator and credit amounts in another accumulator with means for printing both amounts, said successive total printing means being operative under control of said special indicium sensing means for initiating succession of cycles in which totals of the debit and credit amounts are printed and a balance taken and printed, and means under control of said successive cycling means for printing the data on the alphabet records during the same succession of cycles, whereby said alphabet data are printed on the same lines as totals and balance derived from the detail records.

4. A machine of the kind set forth in claim 3 with means for suspending operation of said record feeding means when a detail record follows an alphabet record, said suspension lasting until the termination of the succession of cycles initiated by the special indicium sensing means detecting the presence of the first alphabet record of a group.

5. A machine of the kind set forth in claim 4 with an automatic group control device, and means under control of said group control device for suspending operation of the record feeding means upon detection of different group numbers of successively fed records where the two unlike records are both detail records, both alphabet records, or a detail record of one group followed by an alphabet record of another group.

6. A machine of the kind set forth in claim 5 further characterized by the provision of an error indicator operated under control of the group control devices when record feeding means is suspended upon detection of a different group number concerning two successive detail records, two successive alphabet records, or a detail record followed by an address record.

7. A machine of the kind set forth in claim 6 with means for detecting the operation of the last successive total taking cycle, and means under control of said detecting means for resuming operation of said record feeding means when operation of said record feeding means is suspended during a succession of cycles initiated when a detail record is followed by an alphabet record.

8. In an accounting machine with a plurality of printing, accumulating and total taking devices and having in combination a program device comprising a plurality of stepping relays, progressive controls between said relays including three sets of contacts for each relay for the purposes of initiating, holding and advancing the progressive controls, means for initiating operation of the first relay through its initiating contacts, means for holding the first relay through its holding contacts, means for picking up the second relay through the advancing relay contacts of the first relay, etc., means for selectively stopping the program stepping by disconnecting the holding means on any cycle, and successive sets of control contacts closed successively by said stepping relays to effect cycles of programming.

9. A machine of the kind set forth in claim 8 under control of a succession of groups of detail and alphabet records, means for detecting a change from detail to alphabet records, and means under control of said detecting means for operating said initiating means on a change from detail to alphabet and operating said stopping means on a change from alphabet to detail records.

10. A machine of the kind set forth in claim 9 wherein said successive sets of contacts are divided into two groups, the one group relating to control of the printing control devices for successive alphabet printing on a record sheet and the other group relating to control over accumulating and total taking devices for reading out successively different totals to be printed on said sheet in alignment with said lines of alphabet printing, whereby it is possible to effect simultaneous cycles of alphabet printing and total printing through the use of common stepping relays.

11. A machine of the kind set forth in claim 10 with a plurality of accumulating devices and means for reading totals therefrom, a plurality of plug connections between certain of said successive sets of contacts and certain of said accumulator total taking devices, whereby said programming devices govern the recording of selected totals on selected cycles simultaneously with the recording of alphabet data from a succession of alphabet cards whereby an association of certain alphabet data is effected with certain numerical data on common printing lines of the record sheet.

12. In a machine for recording on a record sheet under control of records divided into groups with item indicia records followed by name and address indicia records in each group, said name and address records being distinguished by a special indicium, means for sensing said item and alphabet indicia, means under control of said sensing means for accumulating credit and debit amounts and a balance total of said item indicia, means under control of said sensing means for printing said item indicia and name and address data on said sheet, means for controlling spacing of said sheet, means for detecting group changes among said records, means for taking totals of the items accumulated, means for detecting the appearance of the first alphabet record with said special indicium, means under control of the last mentioned sensing means for initiating a succession of total printing and address printing cycles to record said name and address data from the alphabet records simultaneous with the recording of successive credit, debit and balance totals from related accumulators in alignment with the address lines on said record sheet.

13. In a cycling control device, a series of single coil relays, one for each cycle step, means for initiating operation of any of said relays, and means cooperating with said relays for making them effective successively.

14. A cycling device of the kind set forth in claim 13 wherein each relay controls contacts for receiving an impulse and holding itself energized and other contacts for picking up the next relay and dropping out the preceding relay, and circuit means cooperating with said contacts.

15. A cycling device of the kind set forth in claim 14 with separate pluggable connections for each of said relays to which said initiating means is selectively connected.

16. A cycling device of the kind set forth in claim 15 with means for terminating cycling by breaking the holding circuit of any relay.

17. A cycling device of the kind set forth in claim 16 with record controlled means for controlling operation of said initiating and terminating means.

LEONARD GROSS.
ERIC BAILEY.

No references cited.